United States Patent

Nishio

[11] Patent Number: 5,877,847
[45] Date of Patent: Mar. 2, 1999

[54] EXPOSURE DEVICE

[75] Inventor: Tomonori Nishio, Kanagawa, Japan

[73] Assignee: Fuji Photo Film Co., Ltd., Kanagawa, Japan

[21] Appl. No.: 801,496

[22] Filed: Feb. 18, 1997

[30] Foreign Application Priority Data

Mar. 25, 1996 [JP] Japan .................................. 8-068471

[51] Int. Cl.$^6$ .................................................. G03B 27/72
[52] U.S. Cl. ................................ 355/71; 355/66; 355/67
[58] Field of Search ................................ 355/66, 67, 71; 399/221

[56] References Cited

U.S. PATENT DOCUMENTS 3,469,916  9/1969  Sloan ........................................ 355/71
4,380,390  4/1983  Tateoka et al. .......................... 355/71
4,451,143  5/1984  Goodman ................................. 355/66

FOREIGN PATENT DOCUMENTS 58-68062  4/1983  Japan .
61-26036  2/1986  Japan .

*Primary Examiner*—Alan A. Mathews
*Attorney, Agent, or Firm*—Sughrue, Mion, Zinn, Macpeak & Seas, PLLC

[57] ABSTRACT

The present invention is an exposure device which comprises: a lens by which an image of an original is formed on a photosensitive material and of which an optical axis is disposed at a position shifted from the center of the original toward an outer peripheral side of the original; an illuminating device for illuminating the original; and a light shading device disposed in the vicinity of the lens so that at least a portion, in proximity to the optical axis of the lens, of an effective luminous flux which is made incident on or emitted from the lens, is shaded.

15 Claims, 12 Drawing Sheets

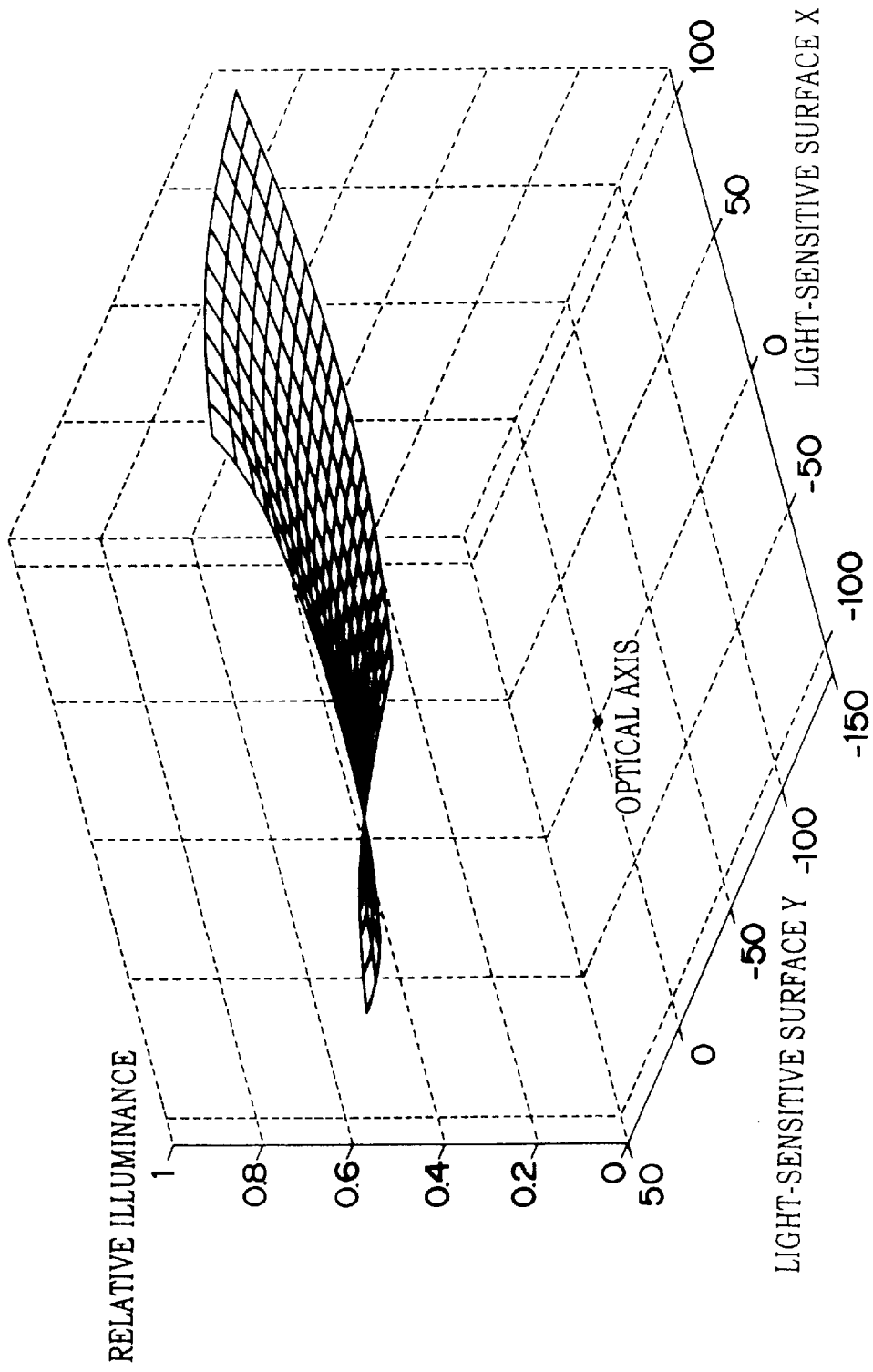
F I G. 7

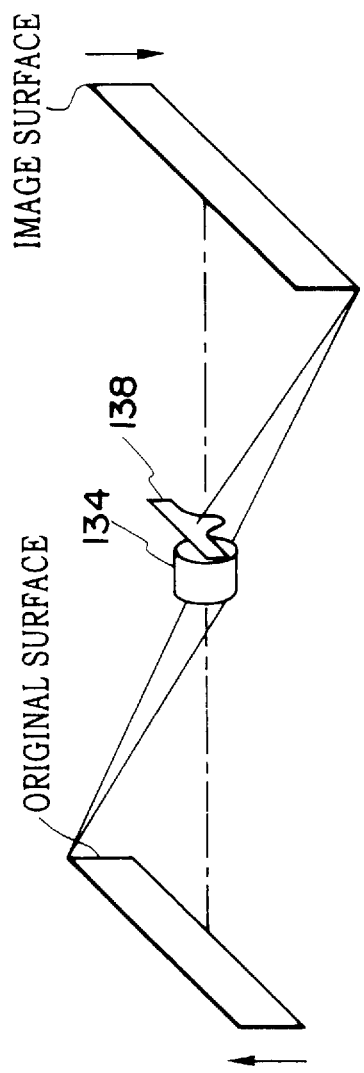

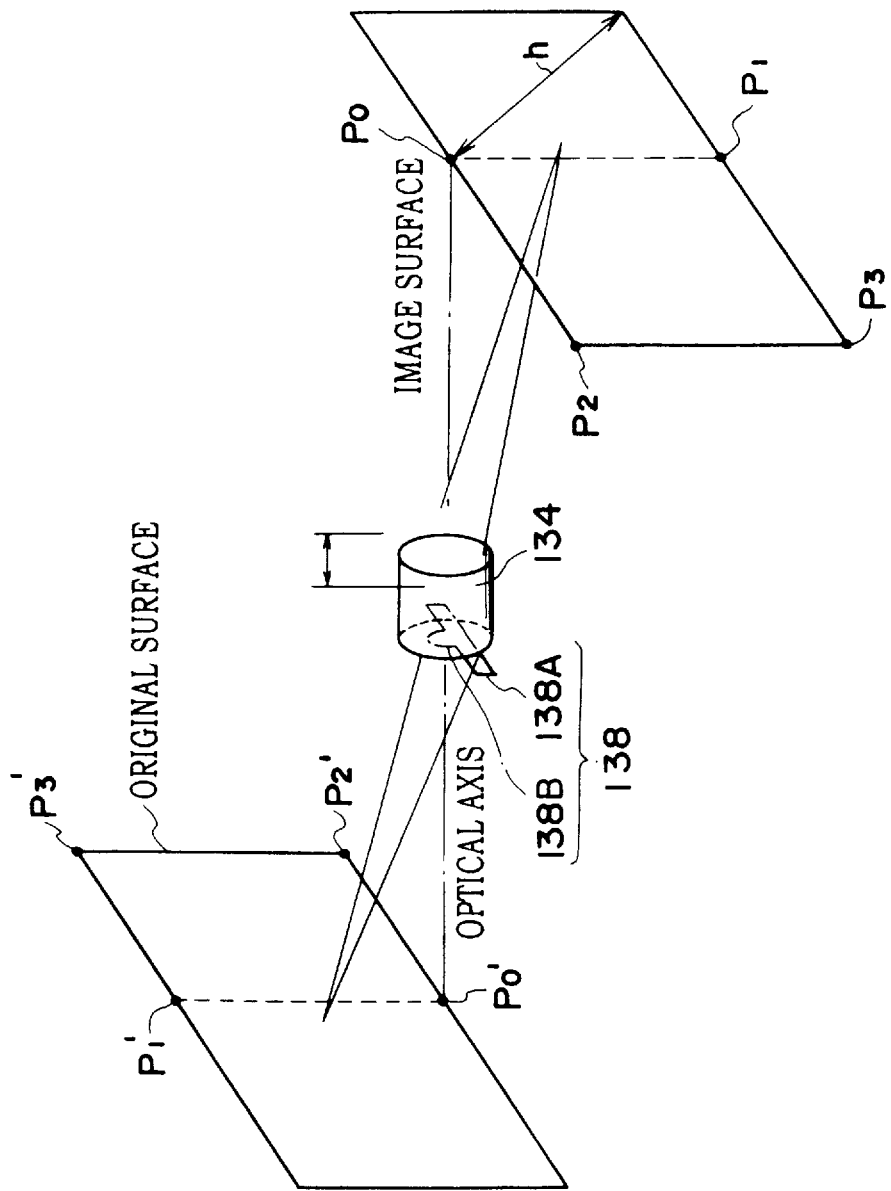

EXPOSURE DEVICE

BACKGROUND OF THE INVENTION

1. Field of the Invention

The present invention relates to an exposure device having a lens by which an image of an original is formed on a photosensitive material and of which an optical axis is disposed at a position shifted from the center of the original to an outer peripheral side of the original and having an illuminating means for illuminating the original.

2. Description of the Related Art

Conventionally, there has been known an image forming device in which an original is illuminated by a light source and an image of the illuminated original is formed on a photosensitive material by using an imaging lens.

On the other hand, the imaging lens has the characteristic referred to as $COS^4$ Law. When the surface of a plane original which is perpendicular to an optical axis of the imaging lens is a uniform diffusing surface, the difference between an illuminance at a position in proximity to the optical axis on an image surface facing the plane original and an illuminance at a point separated from the optical axis on the image surface becomes larger and a problem arises in that shading occurs.

In order to correct the shading, there has been proposed an image forming device of a slit exposure type disclosed in Japanese Patent Application Laid-Open (JP-A) No. 58-68062. This image forming device is, as shown in FIG. 11A, provided with an original stage 1 which can move in a direction indicated by arrow E, a light source 2 for illuminating an original, a slit 3 which causes the light reflected from the original to becomes a slit light extending in a direction perpendicular to the direction in which the original stage 1 moves, a lens 4 which can move in the direction of the optical axis and by which an image of the original is formed on a photosensitive material, and a correcting plate 5 disposed on the side where light is emitted from the lens 4 and provided to be movable integrally with the lens 4, and as shown in FIG. 11B, a distribution of a quantity of light on an image surface in a direction corresponding to a direction along a longer side of the slit is made uniform by the correcting plate 5.

Further, there has also been proposed an image forming device of a surface exposure type disclosed in Japanese Patent Application Laid-Open (JP-A) No. 61-26036. In this image forming device, as shown in FIG. 12, a flash lamp 8 and a reflector 9 are disposed below each of corner portions 7A of a platen glass 7 fitted into an upper surface 6A of a housing 6 having a rectangular box-shaped configuration, and each of the flash lamps 8 illuminates an area which is about a quarter of a total area of the platen glass 7 including a corresponding corner portion 7A.

However, although the former image forming device disclosed in JP-A No. 58-68062 allows the distribution of a quantity of light on the image surface in the direction corresponding to the longitudinal direction of the slit to become uniform, the distribution of the quantity of light in the widthwise direction of the slit cannot be made uniform.

Further, in the latter image forming device disclosed in JP-A No. 61-26036, each flash lamp 8 and each reflector 9 must be formed and disposed such that the light of the each of flash lamps 8 illuminates an area which is about a quarter of the total area of the platen glass 7 including the corresponding corner portion 7A. For this reason, an illuminating system becomes complicated and the cost thereof increases.

SUMMARY OF THE INVENTION

In order to solve the above-described problems, it is an object of the present invention to provide an exposure device which can correct shading in a two-dimensional manner at a low cost.

A first aspect of the present invention is an exposure device comprising: a lens by which an image of an original is formed on a photosensitive material and of which an optical axis is disposed at a position shifted from the center of the original toward an outer peripheral side of the original; illuminating means for illuminating the original; and light shading means disposed in the vicinity of the lens so that at least a portion, in proximity to the optical axis of the lens, of an effective luminous flux which is made incident on or emitted from the lens, is shaded.

In accordance with the first aspect of the present invention, in the exposure device which comprises the lens by which the image of the original is formed on the photosensitive material and of which the optical axis is disposed at a position shifted from the center of the original toward the outer peripheral side of the original, and the illuminating means for illuminating the original, the illuminance of a portion of the photosensitive material positioned in the vicinity of the optical axis of the lens becomes higher than that of other portions of the photosensitive material in accordance with the $COS^4$ Law.

However, in the present invention, the light shading means disposed in the vicinity of the lens allows cutting of the portion of the effective luminous flux in the vicinity of the optical axis, and shading can be corrected in a two-dimensional manner accordingly.

A second aspect of the present invention is an exposure device, in which, in the first aspect of the present invention, the lens and the light shading means are provided so as to be movable integrally with each other. Since the light shading means is moved integrally with the variable power operation of the lens, the shading can be corrected irrespective of magnification.

A third aspect of the present invention is an exposure device, in which, in the first and second aspects of the present invention, the illuminating means is disposed so that light is irradiated from a position further apart from the center of the original than the shifted position of the optical axis of the lens. In this case, for example, one lamp or the like can be used as the illuminating means, and the shading can be corrected at a low cost by one lamp and the above-described light shading means.

BRIEF DESCRIPTION OF THE DRAWINGS

FIG. 7 is a characteristic view illustrating a relative illuminance on a photosensitive material as a compensation effect of the shading correcting mask.

FIG. 9 is a schematic perspective view illustrating a positional relationship between the surface of the original, the optical axis of the lens, the shading correcting mask, and the image surface at the time of slit exposure.

FIG. 10 is a schematic perspective view showing a positional relationship between the surface of the original, the optical axis of the lens of the exposure device shown in FIG. 1, the shading correcting mask, and the image surface when the shading correcting mask is disposed at the side where light is made incident on the lens.

DESCRIPTION OF THE PREFERRED EMBODIMENTS

Referring now to FIGS. 1 through 8, an exposure device 122 according to a first embodiment of the present invention will be described hereinafter.

Figure 1:
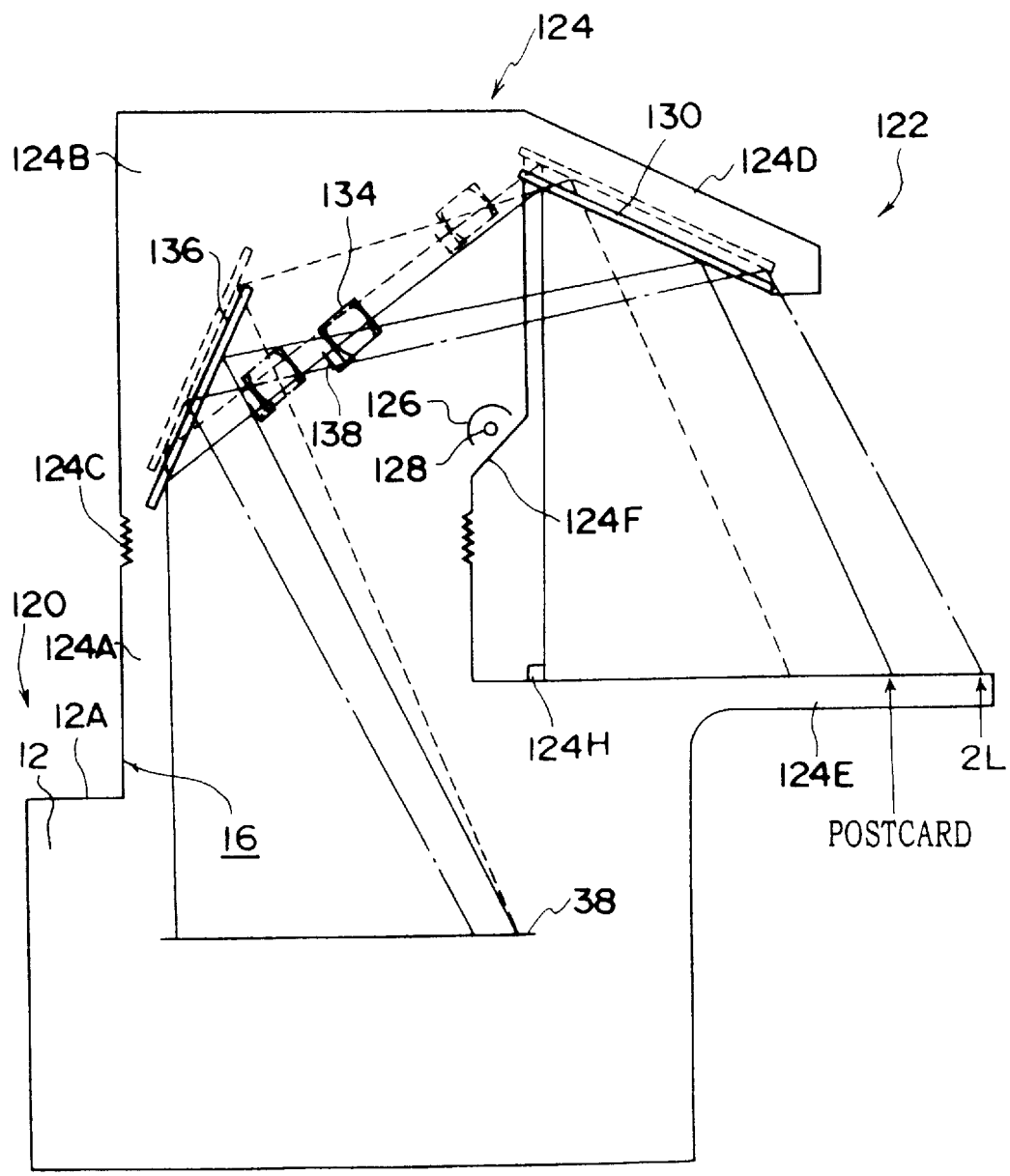
FIG. 1 is a schematic structural view of the interior of an exposure device according to an embodiment of the present invention.

As shown in FIG. 1, the exposure device 122 forms, together with a developing device and a transfer device both of which are not shown, an image forming device 120. The exposure device 122 includes a case 124 which is formed integrally with a substantially rectangular box-shaped machine stand 12 of the image forming device 120. The case 124 is formed from a first main body 124A having a substantially rectangular frame-shaped configuration, a second main body 124B having a substantially rectangular box-shaped configuration, a rectangular bellows portion 124C, a rectangular roof portion 124D, and a rectangular original mounting stand 124E. The first main body 124A is disposed so as to cover a substantially rectangular opening portion 16 formed on an upper surface 12A of the machine stand 12 of the image forming device 120, and the second main body 124B is disposed above the first main body 124A with a lower portion thereof being opened. The bellows portion 124C is formed in such a manner that one end thereof is fixed to an upper end of the first main body 124A and another end is fixed to a lower end of the second main body 124B, and the roof portion 124D is formed integrally with an upper portion of the second main body 124B in such a manner as to incline downward. Further, the original mounting stand 124E extends horizontally from a lower portion of the first main body 124A and in the substantially same direction of the roof portion 124D. Note that the side of an end portion of the original mounting stand 124E, which is opposite to other end portion thereof formed continuously from the first main body 124A, is referred to as a front side of the device near the position of an operator; left and right directions on the paper of FIG. 1 are respectively referred to as backward and forward directions of the device; a vertical direction on the paper of FIG. 1 is referred to as the vertical direction of the device; and a direction perpendicular to the paper of FIG. 1 is referred to as left and right directions of the device.

The upper surface of the original mounting stand 124E is formed as a surface on which an original is mounted. A plane original or a stereoscopic original is mounted on the original mounting stand 124E with a surface on which an image is formed (which the surface is, in the case of the plane original, a surface on which an image is recorded, and in the case of the stereoscopic original, a surface on which an image is reproduced) being directed upward. A guide 124H for positioning the plane original is formed on the upper surface of the original mounting stand 124E at the inner side of the device (namely, at the side where the original mounting stand 124E and the first main body 124A are connected). The guide 124H has a substantially rectangular configuration which extends along a longer side of the original mounting stand 124E (i.e., along the left-to-right direction of the device). Unillustrated graduations corresponding to a size of original are marked on an upper surface of the guide 124H and on a side surface of the guide 124H on the front side of the device. These graduations are provided in the left-and-right directions of the device from a center line E, which indicates the center of the original mounting stand 124E in the left-to-right direction of the device, set as a reference line. The original is positioned in accordance with the graduations with the center thereof coinciding with the center line E. Further, the plane original is positioned in such a manner that an end portion thereof at the inner side of the device abuts against the guide 124E and in accordance with the graduations of the size of a corresponding original. Meanwhile, examples of the plane original which can be mounted on the original mounting stand 124E includes a post card, an original of 2L size, and the like.

As shown in FIG. 1, an inclined portion 124F is formed at a lower portion of the second main body 124B on the surface at the front side of the device in such a manner as to be inclined upward and toward the front side of the device. A notch is formed in the inclined portion 124F at a predetermined position which will be described below, and a reflector 126 and a lamp 128 serving as illuminating means are fixed in the notch.

Further, a first mirror 130 is fixed at a lower-side inclined surface of the roof portion 124D (i.e., the surface which faces the original mounting stand 124E) so as to cause light illuminated from the lamp 128 and reflected from the original to be reflected toward the surface of the second main body 124B on the front side of the device.

Moreover, an unillustrated opening portion having a substantially rectangular configuration is formed on the surface of the second main body 124B at the front side of the device, and light reflected by the first mirror 130 is made incident into the interior of the device from the opening portion. A lens 134 provided with a built-in shutter is disposed in the interior of the second main body 124B and on an optical path of the light reflected from the first mirror 130, and a shading correcting mask 138 serving as light shading means is disposed at the side where light is emitted from the lens 134. The lens 134 and the shading correcting mask 138 are connected to an unillustrated driving means and can be moved integrally along the optical path of the light reflected from the first mirror 130, i.e., along an optical axis. Further, an unillustrated diaphragm mechanism is provided in the vicinity of the lens 134.

Figure 2:
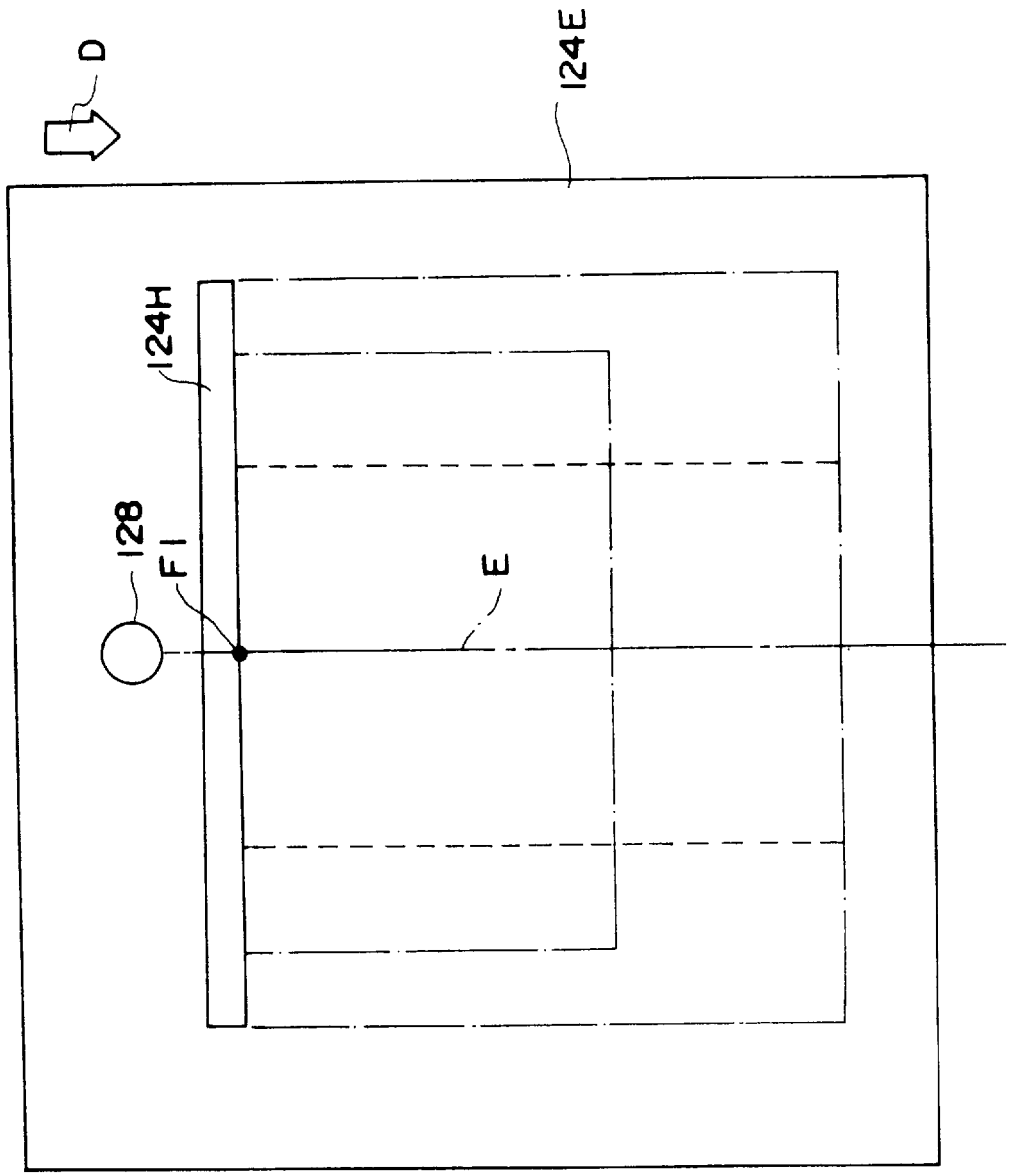
FIG. 2 is a plan view illustrating a positional relationship between a position of an original to be mounted on an original mounting stand, an optical axis of a lens, and a position of a lamp when seen from the top side of the exposure device shown in FIG. 1.
Figure 3:
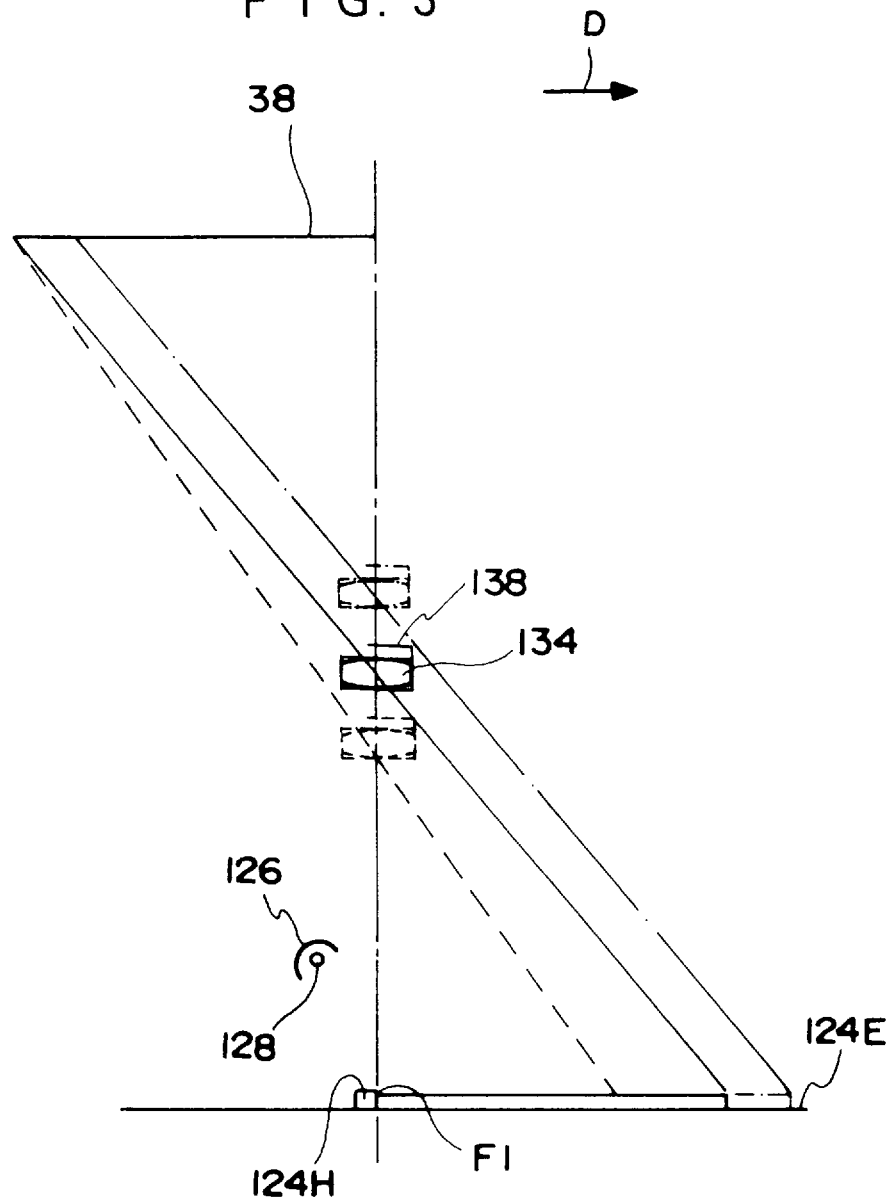
FIG. 3 is a illustration of a positional relationship between the position of the original mounted on the original mounting stand, the optical axis of the lens, and the position of the lamp when seen from the side of the exposure device shown in FIG. 1.

FIG. 2 shows a positional relationship between a position of an original to be mounted on the original mounting stand 124E when seen from the top side of the exposure device 122, the optical axis of the lens 134 (i.e., an axis passing through an intersection point $F_1$ described later), and the position of the lamp 128. FIG. 3 shows a positional relationship between a position of the original to be mounted on the original mounting stand 124E when seen from the side of the exposure device 122, the optical axis of the lens 134, and the position of the lamp 128. As illustrated in FIGS. 2 and 3, the optical axis of the lens 134 is provided to pass through the intersection point $F_1$ of the center line E and an edge portion of the original at the side of the guide 124H. As a result, even when any size of original is mounted on the original mounting stand 124E, the optical axis of the lens 134 is disposed further toward the inner side of the device than the central point of the original. Further, the lamp 128 is disposed, with respect to the lens 134, on the side where the optical axis of the lens 134 is shifted from the central point of the original. Specifically, the lamp 128 is, as shown in FIGS. 2 and 3, disposed at a position further toward the inner side of the device than the intersection point $F_1$ on the center line E and above the original mounting stand 124E, and is also disposed at a position near the original mounting stand 124E in such a manner that a quantity of light which is greater than or equal to a desired value can be obtained on the entire surface of the original on which images are formed. Accordingly, the lamp 128 is provided at a position apart from the center of the original more than the shifted optical axis of the lens 134.

Figure 4:
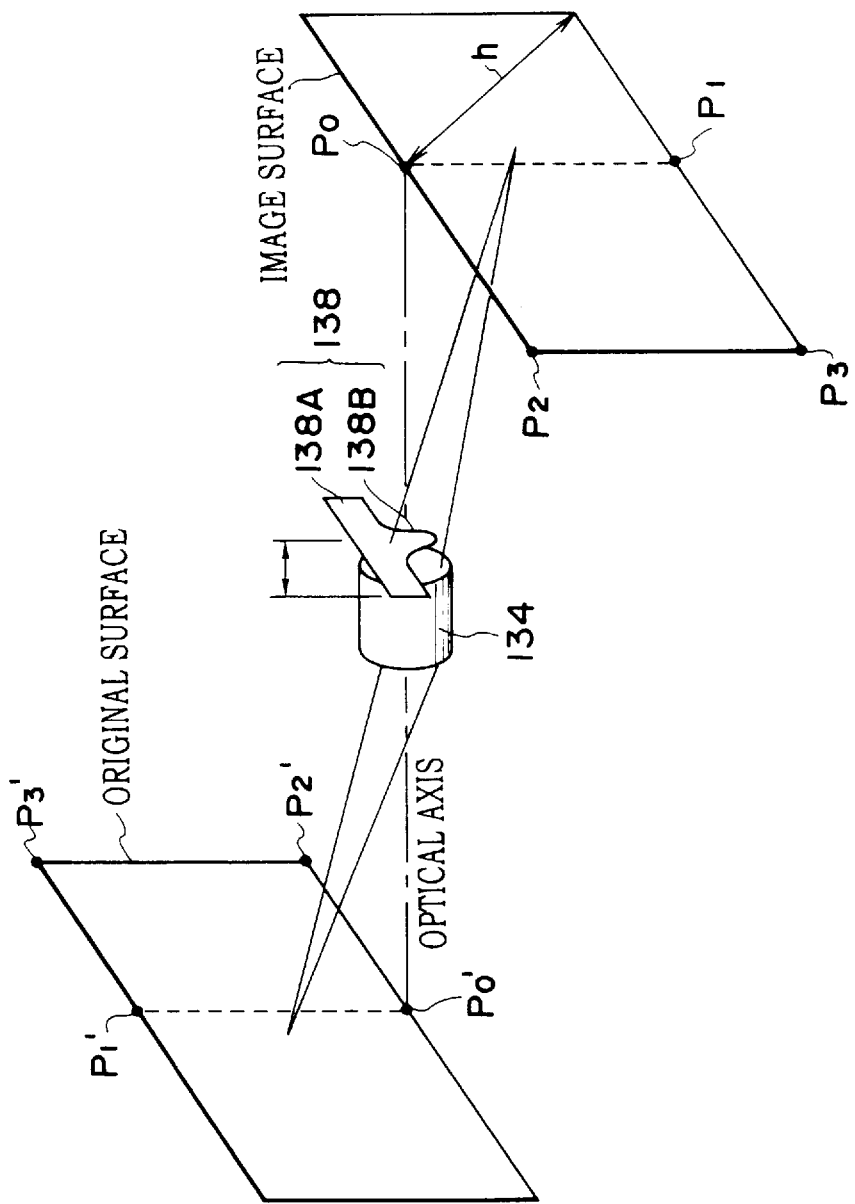
FIG. 4 is a schematic perspective view showing a positional relationship between a surface of an original, the optical axis of the lens of the exposure device shown in FIG. 1, a shading correcting mask and an image surface.
Figure 5:
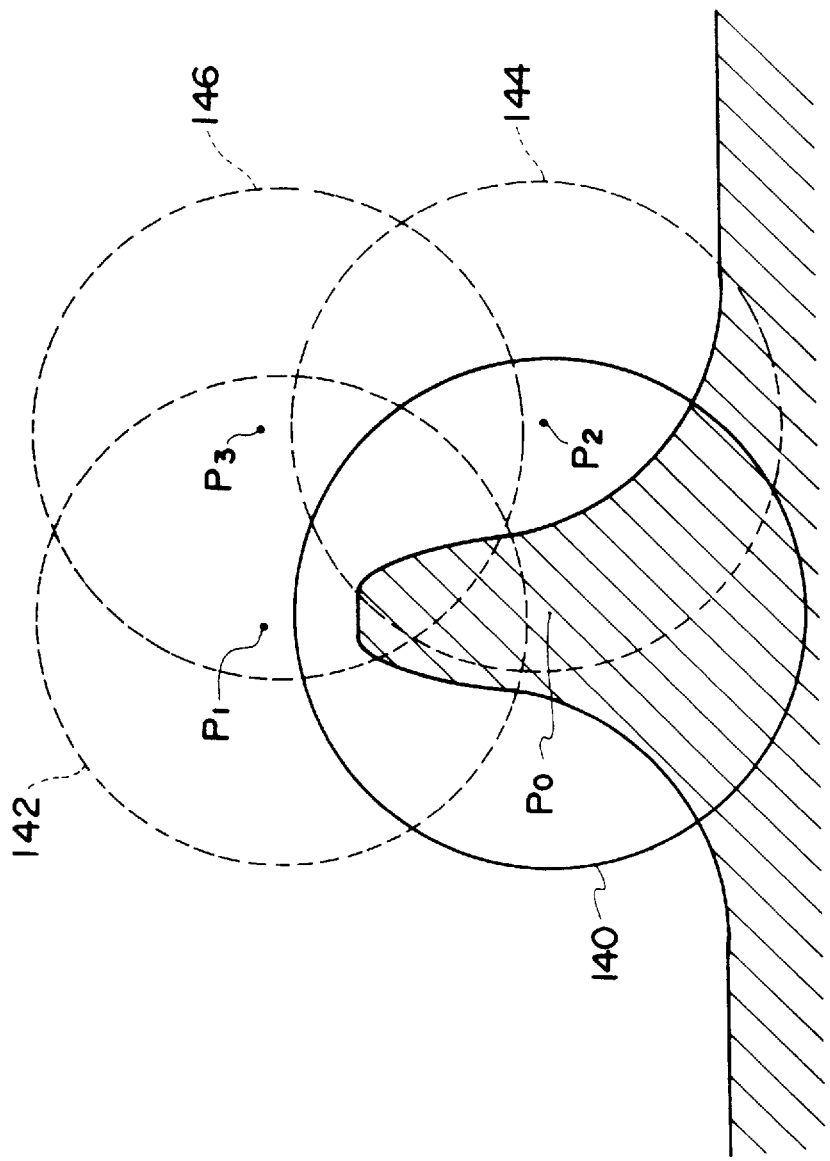
FIG. 5 is an explanatory view showing a positional relationship of the shading correcting mask with respect to an exit pupil of the lens of the exposure device shown in FIG. 1 when seen from points $P_0$, $P_1$, $P_2$, $P_3$ in FIG. 4.

FIG. 4 shows the shape of the shading correcting mask 138 and the position thereof with respect to the lens 134. FIG. 5 shows the position of the shading correcting mask 138 with respect to an exit pupil of the lens 134 when the lens 134 and the shading correcting mask 138 are seen from points $P_0$, $P_1$, $P_2$, $P_3$ on the image surface shown in FIG. 4. As shown in FIG. 4, the shading correcting mask 138 is made of a material which can shade light and is formed from a base portion 138A having a rectangular plate-shaped configuration and an inverted V-shaped projecting portion 138B which extends from a substantially central portion on a longer side of the base portion 138A in the direction of a shorter side thereof. The shading correcting mask 138 is disposed at a position in proximity to the side where light is emitted from the lens 134. The base portion 138A is disposed at an opposite side of the center of the lens 134 with respect to the direction of the optical axis shifted from the center of the original (i.e., at an upper side of the lens 134 on an image surface side in FIG. 4), and the projecting portion 138B is disposed at the side of the optical axis shifted from the center of the original with respect to the center of the lens 134 (i.e., at a lower side of the lens 134 on the image surface side in FIG. 4). As shown in FIG. 4, the position of the shading correcting mask 138 with respect to the exit pupil of the lens 134 when the lens 134 and the shading correcting mask 138 are seen from the point $P_0$ where the image surface and the optical axis of the lens 134 intersect each other is indicated by the solid line 140 in FIG. 5, and the position of the shading correcting mask 138 with respect to the exit pupil of the lens 134 when seen from the point $P_1$ of point symmetry of the point $P_0$ with respect to the central point of the image surface is indicated by the broken line 142 in FIG. 5. Further, the position of the shading correcting mask 138 with respect to the exit pupil of the lens 134 when the lens 134 and the shading correcting mask 138 are seen from a corner point $P_2$ of the image surface on the longer side including the point $P_0$ is indicated by the broken line 144 in FIG. 5, and the position of the shading correcting mask 138 with respect to the exit pupil of the lens 134 when seen from a corner point $P_3$ on an opposite side of the point $P_2$ on the shorter side including the point $P_2$ of the image surface is indicated by the broken line 146 in FIG. 5. As seen from FIGS. 4 and 5, a luminous flux from the side where the optical axis of the lens 134 is shifted with respect to the central point of the original, namely, the side near the lamp 128 (i.e., the side of the longer side of the surface of the original including the points $P_0'$, $P_2'$) is cut off by an amount which is greater than that of a luminous flux from the opposite side of the direction where the optical axis of the lens 134 is shifted with respect to the central point of the original (i.e., the side of the longer side including the points $P_1'$, $P_3'$). Further, a luminous flux from the side of the central portion in the direction of the longer side of the image surface (i.e., the side of points $P_0'$, $P_1'$) is cut off by an amount which is greater than that of a luminous flux from the side of the corner portions on the longer side of the image surface (i.e., the side of points $P_2'$, $P_3'$). In other words, the shading correcting mask 138 allows a portion of an effective luminous flux in proximity to the optical axis and a portion thereof reflected by a portion of the original near the lamp 128 to be cut off more than other remaining portions of the effective luminous flux.

Meanwhile, one end of unillustrated bellows is mounted to the above-described opening portion formed in the second main body 124B, and the other end of the bellows is mounted to the lens 134, thereby preventing unnecessary light from entering the interior of the device.

Further, as shown in FIG. 1, a second mirror 136 is fixed within the second main body 124B and on the optical axis of the lens 134 and causes the effective luminous flux of which one portion is cut off by the shading correcting mask 138 after having been transmitted through the lens 134 to be reflected downward. A photosensitive material 38 is disposed at a position where light reflected by the second mirror 136 is illuminated, with a light-sensitive surface thereof being directed upward and the surface exposure processing is performed in such a manner that the light reflected by the second mirror 136 is illuminated to the photosensitive material 38.

Meanwhile, an unillustrated X arm for expanding and contracting the bellows is provided at each of both sides of the bellows portion 124C in the left-and-right directions of the device. The X arm includes two arm portions and respective central portions of the arm portions are fastened. One end of the arm portion is engaged slidably with an unillustrated groove formed in an upper end portion of the first main body 124A and the other end of the arm portion is engaged slidably with an unillustrated groove formed in a lower end portion of the second main body 124B. The unillustrated driving means connected to the X arm and the lens 134 is connected to an unillustrated variable power lever which projects from an unillustrated opening portion formed on the side surface of the second main body 124B. When the variable power lever is moved along the opening portion by an operator in accordance with a magnification, the X arm slides in the groove formed in the upper end portion of the first main body 124A and in the groove formed in the lower end portion of the second main body 124B to expand and contract the bellows to move the first mirror 130, the lens 134, the shading correcting mask 138, and the second mirror 136 integrally in the vertical direction of the device. Further, the lens 134 and the shading correcting mask 138 move along the optical path from the first mirror 138, and the length of the optical path from the original to the lens 134 and the length of the optical path from the lens 134 to the photosensitive material 38 are respectively altered.

In the exposure device 122 according to the present embodiment, when an unillustrated switch is turned on, the lamp 128 is lighted. The original is mounted by the operator on the original mounting stand 124E in such a manner that the surface thereof where an image is formed is directed upward, light irradiated from the lamp 128 is reflected by the original and further reflected by the first mirror 130, and thereafter, the reflected light is made incident on the interior of the device. When an instruction of reproduction is given by the operator via an unillustrated operation panel, a shutter incorporated into the lens 134 opens instantaneously and the light reflected by the first mirror 130 pass through the lens 134. A portion of the effective luminous flux passing through the lens 134 is cut off by the shading correcting mask 138. A remaining portion of the effective luminous flux is reflected by the second mirror 136, and thereafter, is irradiated on the photosensitive material 38 of which light-sensitive surface is directed upward. In this way, the surface exposure processing is effected. The photosensitive material 38 subjected to the surface exposure processing is guided to a developing device and a transfer device both of which are not shown, disposed on a downstream side of a conveying path in the exposure device 122, and is subjected to development and transfer processing therein.

In the case of the above surface exposure processing, as shown in FIGS. 2 and 3, the optical axis of the lens 134 is disposed at a position shifted from the center of the original, specifically, at the intersection point $F_1$ of the center line E and the edge portion of the original at the inner side of the device, and the lamp 128 is disposed above the position on the center line E further toward the inner side of the device than the intersection point $F_1$ of the center line E and the optical axis of the lens 134. For this reason, the image forming device 120 according to the present embodiment can make it possible to prevent an image of the lamp 128 itself from being formed on the photosensitive material 38. Further, in the exposure device 122 according to the present embodiment, the lamp 128 is disposed at a short distance from the original so that a quantity of light which is greater than or equal to a desired value can be obtained on the entire surface of the original, and illuminating efficiency can be improved.

Moreover, according to the present embodiment, the portion of the effective luminous flux in the vicinity of the optical axis of the lens 134 and the portion thereof reflected by the original in the vicinity of the lamp 128 are cut off by the shading correcting mask 138 more than the other remaining portions of the effective luminous flux. For this reason, it is possible to correct shading in a two-dimensional manner without moving the lamp 128. This operation will be specifically described hereinafter by using data.

Figure 6:
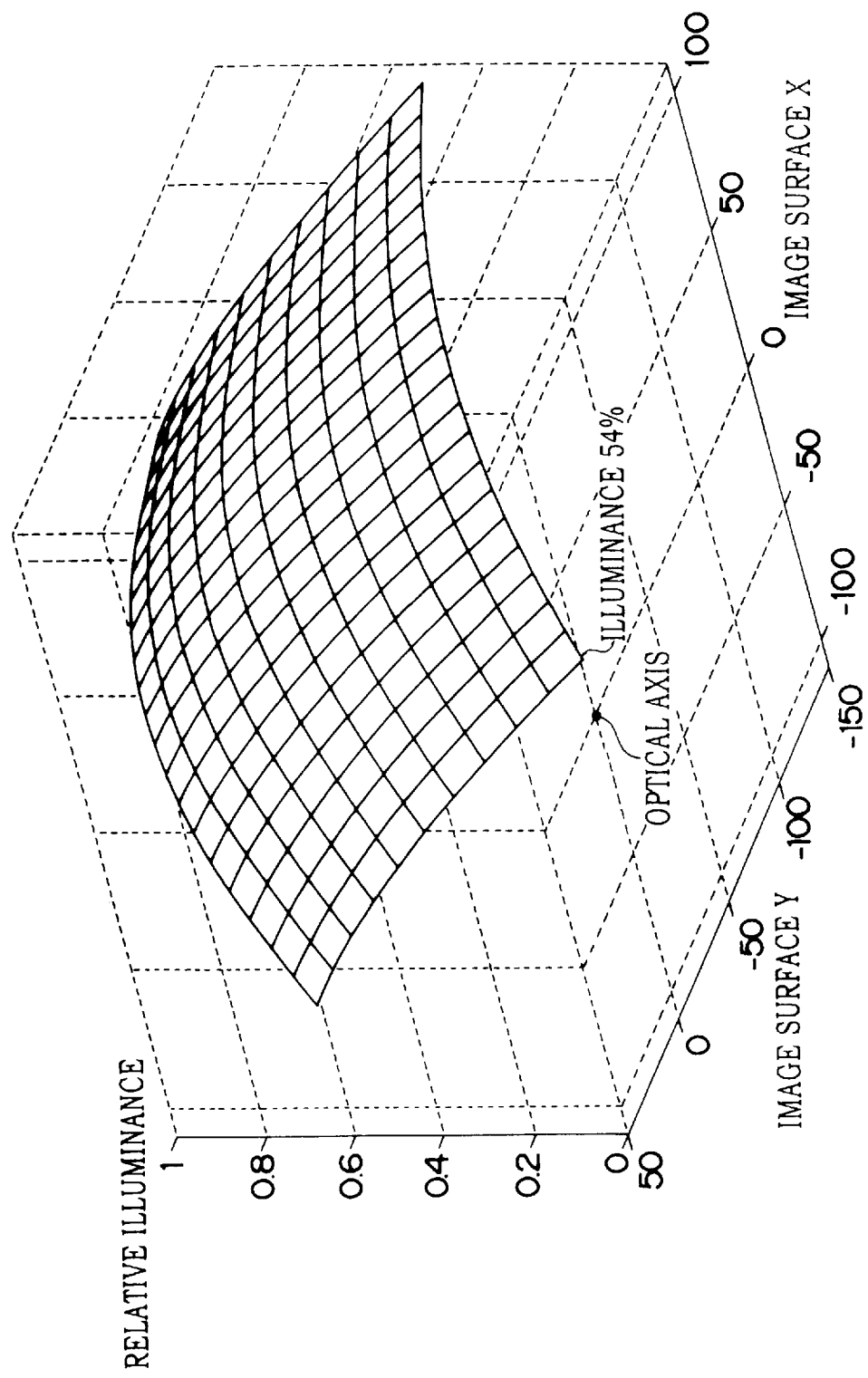
FIG. 6 is a characteristic view illustrating a relative illuminance on an image surface when the shading correcting mask is removed.

FIG. 6 shows a relative illuminance on the image surface of the exposure device 122 with the shading correcting mask 138 being removed therefrom. The exposure device 122 has the following specifications: the size of original is 148×210 mm (i.e., A5 size); the image size is 148×210 mm; the magnification is 1.0; the focal length of the lens 134 is 150 mm; F-number of the lens 134 is 11; the pupil diameter of the lens 134 is 13.6 (=150/11); the maximum image height h (see FIG. 4; the length from the intersection point of the image surface and the optical axis to a point most apart from the optical axis on the image surface) is 181.5 mm; the maximum field angle (2θ) is 62.4° (=31.2°×2); and the distance from the plane original to a principal point of the lens 134 is 300 mm. It can be understood from FIG. 6 that an illuminance on the side of the optical axis of the lens 134 shifted from the center of the image surface (i.e., on the side of the longer side of the image surface including points $P_0$, $P_2$ in FIG. 4) is higher than that on the opposite side of the direction where the optical axis is shifted from the center of the image surface (i.e., on the side of the longer side including points $P_1$, $P_3$ in FIG. 4) and an illuminance on the side of the central portion of the image surface in the longitudinal direction of the longer side (i.e., the side of points $P_0$, $P_1$ in FIG. 4) is higher than that on the side of the corner portions in the direction of the longer side of the image surface (i.e., the side of points $P_2$, $P_3$ in FIG. 4). Concretely, assuming that the illuminance at point $P_0$ is set as 1, the illuminance at point $P_3$ most apart from the optical axis on the image surface is 0.54.

FIG. 7 shows a relative illuminance of the exposure device 122 on the photosensitive material 38, in which the distance from the plane original to the shading correcting mask 138 is 314 mm and the lens 134 is removed from the exposure device 122. It can be understood from FIG. 7 that, due to the effects of the shading correcting mask 138 which cuts off the portion of the effective luminous flux in the vicinity of the optical axis and the portion reflected by original in a portion near the lamp 128 more than the other remaining portions of the effective luminous flux, the illuminance on the side of the longer side of the image surface including points $P_0$, $P_2$ in FIG. 4 is lower than that on the opposite side, i.e., the longer side including points $P_1$, $P_3$ in FIG. 4, and the illuminance on the side of the central portion of the light-sensitive surface in the direction of the longer side, i.e., the side of points $P_0$, $P_1$ is lower than that on the side of the corner portions of the light-sensitive surface in the direction of the longer side, i.e., the side of points $P_2$, $P_3$.

Figure 8:
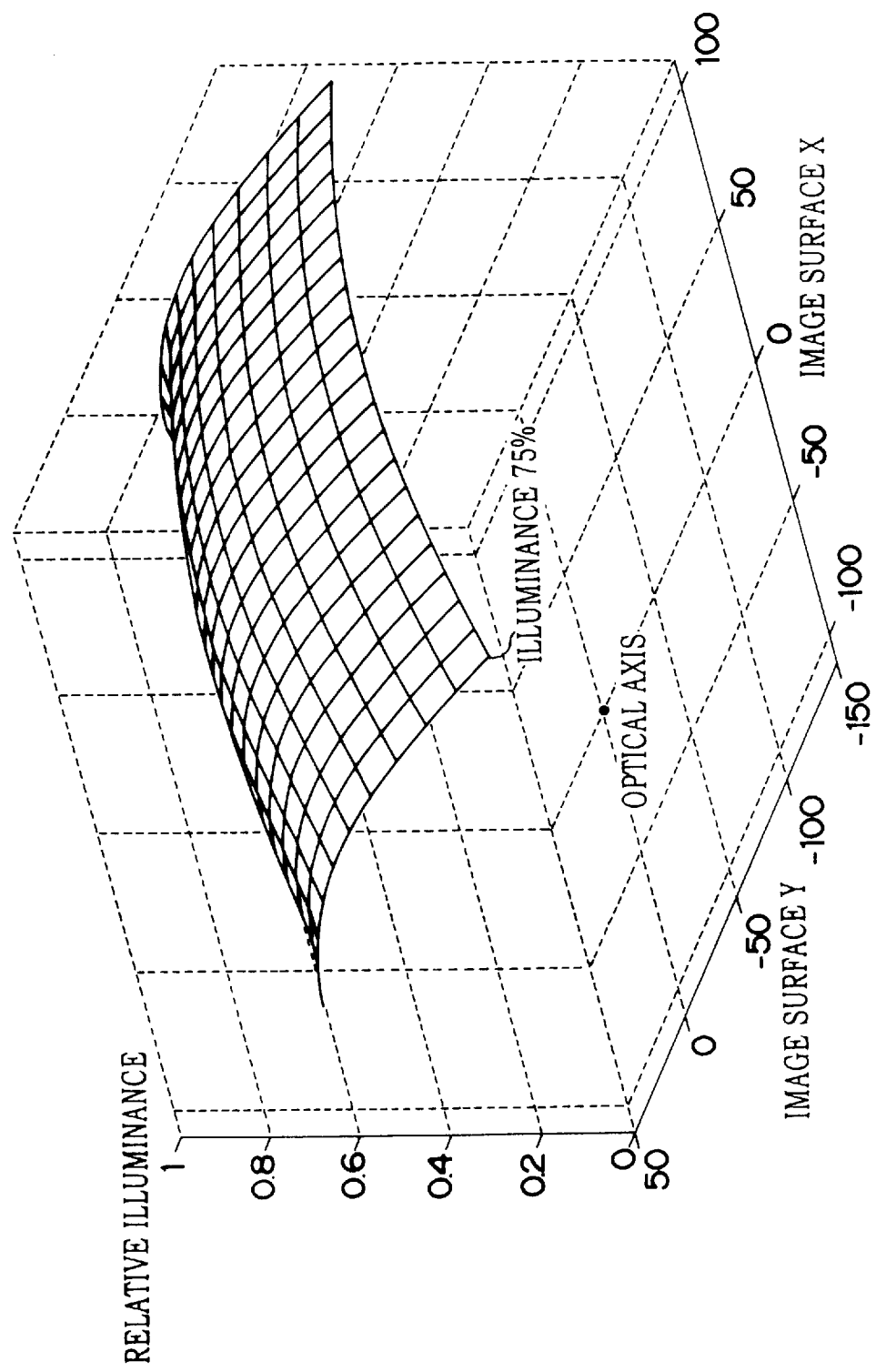
FIG. 8 is a characteristic view illustrating a relative illuminance on an image surface when the shading correcting mask is provided.
Figure 11A:
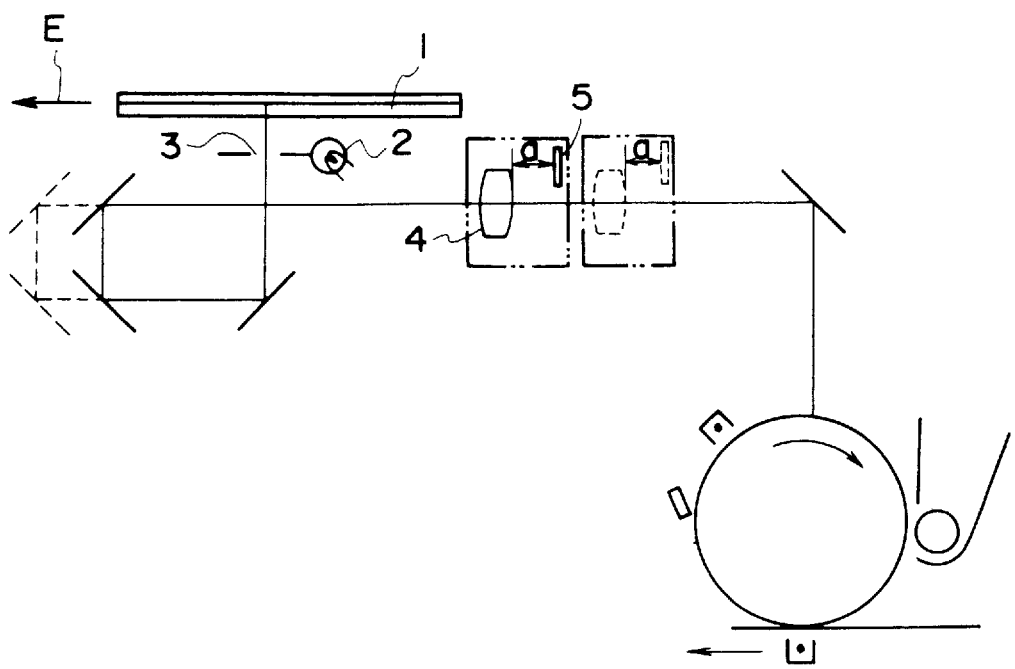
FIG. 11A is a schematic structural view of a conventional image forming device in which a quantity of light is adjusted by a correcting plate.
Figure 11B:
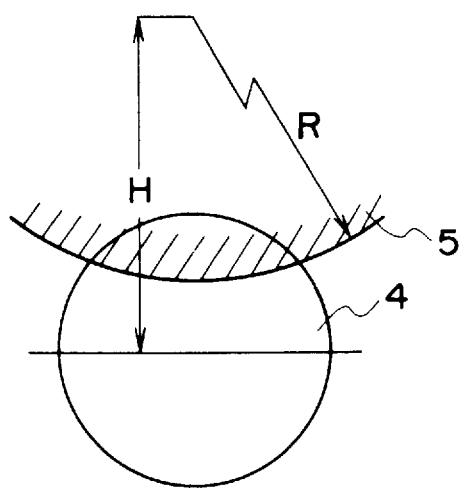
FIG. 11B is a structural view showing a principal portion of the image forming device shown in FIG. 11A.
Figure 12:
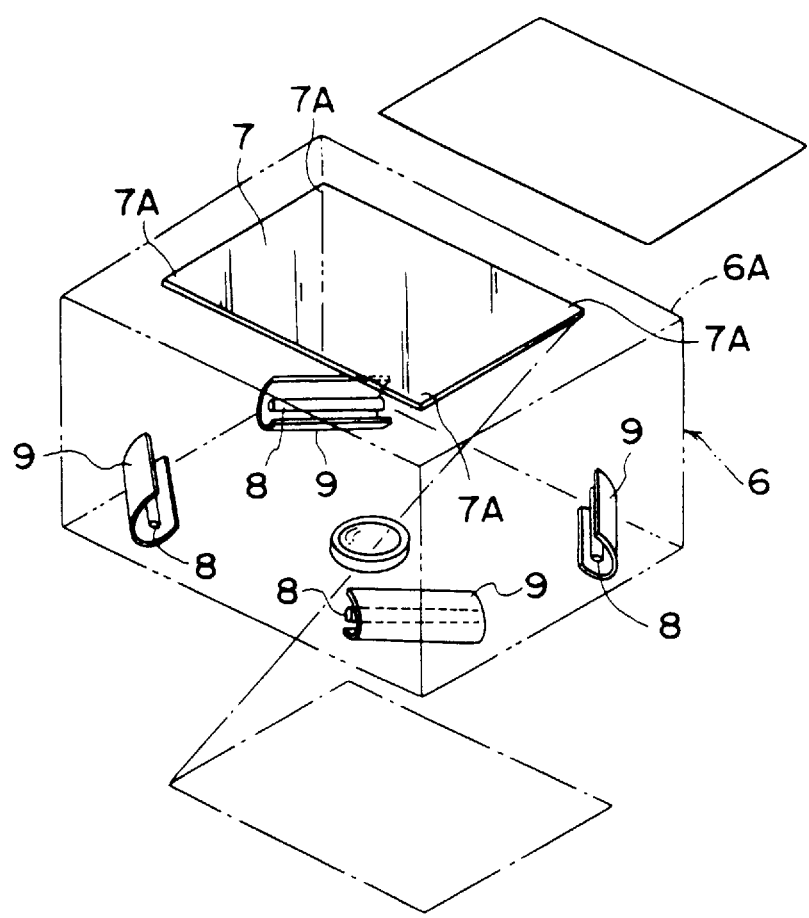
FIG. 12 is a perspective view showing a positional relationship between a platen glass, a lens, and a flash lamp in a conventional image forming device.

FIG. 8 shows a relative illuminance on the image surface of the exposure device 122. The exposure device 122 has the following specifications: the size of original is 148×210 mm; the image size is 148×210 mm; the magnification is 1.0; the focal length of the lens 134 is 150 mm; F-number of the lens 134 is 11; the exit pupil diameter of the lens 134 is 13.6; the maximum image height is 181.5 mm; the maximum field angle is 42° (=21°×2); the distance from the plane original to a principal point of the lens 134 is 300 mm; and the distance from the principal point of the lens 134 to the shading correcting mask 138 is 14 mm. In FIG. 8, the previously-stated problems caused by the $COS^4$ Law and the position of the lamp 128 with respect to the lens 134 is alleviated by the effects of the shading correcting mask 138 shown in FIG. 7, and it can be seen that the relative illuminance on the image surface becomes uniform as compared with that of FIG. 6. In FIG. 8, the relative illuminance at the point $P_3$ in FIG. 4 with respect to the maximum illuminance on the image surface is set to be 0.75.

As described above, in this embodiment, the simple structure formed from one lamp 128 and the shading correcting mask 138 allows two-dimensional correction of shading, and it is possible to manufacture the exposure device 122 at a lower cost and in a compact manner.

Meanwhile, in the image forming device 120, enlargement and reduction of the image close to a magnification of 100% can be effected. For example, as shown in FIGS. 1 and 3, the magnification with the lens 134 disposed at the position indicated by the broken line is 1.4, the magnification with the lens 134 disposed at the position indicated by the solid line is 1, and the magnification with the lens 134 disposed at the position indicated by one-dot and chain line is 0.7.

Further, this embodiment is constructed in that the shading correcting mask 138 disposed in the vicinity of the lens 134 is integrally moved synchronously with the variable power operation of the lens 134, which makes it possible to correct shading irrespective of the magnification.

In the above-described embodiment, the optical axis of the lens 134 is disposed at the point $F_1$ where the center line E and the edge portion of the original intersect each other, but it suffices that the optical axis of the lens 134 is disposed at a position shifted from the center of the original toward an outer peripheral side of the original. Further, in this case, the lamp 128 is disposed on an outer side (i.e., on the inner side of the device) of an optical path of light before being reflected, the light being reflected at a point where an extension line of a line, which connects the intersection point of the original and the optical axis and the central point of the original, intersects the edge portion of the original and reaching the image surface.

Further, in the above embodiment, the exposure device of surface exposure type was described, but the present invention may also be applied to an exposure device of slit exposure type. In this case, the center of the original indicates the center of a portion of an original corresponding to a slit, namely, the center of the slit. As shown in FIG. 9, it suffices that the optical axis is disposed at a position shifted from the center of the slit toward the outer peripheral side of the slit.

Moreover, in the above embodiment, the shading correcting mask 138 is disposed on the side where light is emitted from the lens 134, but the shading correcting mask 138 may also be disposed on the side where light is made incident on the lens 134. In this case, as shown in FIG. 10, it suffices that the shading correcting mask 138 is provided with the base portion 138A being disposed at a lower side of an entrance pupil of the lens and the projecting portion 138B being disposed at the upper side thereof.

Further, in the foregoing, the exposure device for a reflection original is used, but the present invention may also be applied to an exposure device for a transparency original, or an exposure device for exposing an ordinary object, for example, a camera.

In addition, it suffices that the light shading means is formed in the shape which allows the portion of the effective luminous flux in the vicinity of the optical axis and the portion of the effective luminous flux corresponding to a portion of the original near the lamp 128 illuminated thereby, and the shape of the light shading means is not limited to that of the above shading correcting mask.

Further, the illuminating means may be formed from a plurality of lamps.

What is claimed is:

1. An exposure device comprising:
   a lens by which an image of an original is formed on a photosensitive material, an optical axis of said lens being disposed along a line that marks a position shifted from a center point of the original toward an outer peripheral side of the original;
   means for illuminating the original; and
   means for shading light passing through said lens, said light shading means being disposed in a vicinity of said lens so that at least a portion, in proximity to the optical axis of said lens, of an effective luminous flux which is made one of incident on and emitted from said lens, is shaded.

2. The exposure device according to claim 1, wherein said lens and said light shading means are provided so as to be movable integrally with each other along the optical axis.

3. The exposure device according to claim 2, wherein said illuminating means is disposed so that light is irradiated toward said original from a position further apart in distance from the center point of the original than the shifted position of the optical axis of said lens.

4. The exposure device according to claim 3, wherein said illuminating means is disposed at a position with respect to the optical axis in which an image of said illuminating means is not formed on a photosensitive material.

5. The exposure device according to claim 1, wherein said light shading means is provided to shade a luminous flux made of incident on and emitted from said lens so that an illuminance on a photosensitive material is substantially uniform.

6. The exposure device according to claim 1, wherein said light shading means is a mask.

7. The exposure device according to claim 1, wherein said illuminating means is disposed so that light is irradiated toward said original from a position further apart in distance from the center point of the original than the shifted position of the optical axis of said lens.

8. The exposure device according to claim 7, wherein said illuminating means is disposed at a position with respect to the optical axis in which an image of said illuminating means is not formed on a photosensitive material.

9. An exposure device comprising:
   a lens by which an image of an original is formed on a photosensitive material, an optical axis of said lens being disposed along a line that marks a position shifted from a center point of the original toward an outer peripheral side of the original;
   means for illuminating the original; and
   means for shading light passing through said lens, said light shading means being disposed in a vicinity of said lens so that at least a portion, in proximity to the optical axis of said lens, of an effective luminous flux which is made one of incident on and emitted from said lens, is shaded, said light shading means being provided to shade a luminous flux made one of incident on and emitted from said lens so that an illuminance on the photosensitive material is substantially uniform.

10. The exposure device according to claim 9, wherein said lens and said light shading means are provided so as to be movable integrally with each other along the optical axis.

11. The exposure device according to claim 10, wherein said illuminating means is disposed so that light is irradiated toward said original from a position further apart in distance from the center point of the original than the shifted position of the optical axis of said lens.

12. The exposure device according to claim 11, wherein said illuminating means is disposed at a position with respect to the optical axis in which an image of said illuminating means is not formed on a photosensitive material.

13. The exposure device according to claim 9, wherein said light shading means is a mask.

14. The exposure device according to claim 9, wherein said illuminating means is disposed so that light is irradiated toward said original from a position further apart in distance from the center point of the original than the shifted position of the optical axis of said lens.

15. The exposure device according to claim 14, wherein said illuminating means is disposed at a position with respect to the optical axis in which an image of said illuminating means is not formed on a photosensitive material.

* * * * *